(12) United States Patent
Zhao

(10) Patent No.: US 7,006,473 B2
(45) Date of Patent: Feb. 28, 2006

(54) SOFT HANDOVER METHOD FOR CDMA MOBILE COMMUNICATION SYSTEM

(75) Inventor: Jian Zhao, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 927 days.

(21) Appl. No.: 10/051,257

(22) Filed: Jan. 18, 2002

(65) Prior Publication Data

US 2002/0061751 A1 May 23, 2002

Related U.S. Application Data

(63) Continuation of application No. PCT/CN01/00797, filed on May 15, 2001.

(30) Foreign Application Priority Data

May 19, 2000 (CN) .............................. 00107632 A

(51) Int. Cl.
H04Q 7/00 (2006.01)
(52) U.S. Cl. ........................................ 370/332; 455/442
(58) Field of Classification Search ................ 370/331, 370/332, 335, 342, 441, 500; 455/442
See application file for complete search history.

(56) References Cited

U.S. PATENT DOCUMENTS

| | | | |
|---|---|---|---|
| 5,267,261 A * | 11/1993 | Blakeney et al. ........... 370/332 |
| 5,327,576 A | 7/1994 | Uddenfeldt et al. | |
| 6,049,716 A | 4/2000 | Jung | |
| 6,055,428 A * | 4/2000 | Soliman ..................... 455/437 |
| 6,154,653 A | 11/2000 | Jung | |
| 6,337,984 B1 * | 1/2002 | Hong et al. ................. 455/439 |
| 6,782,261 B1 * | 8/2004 | Ahmed et al. .............. 455/436 |

FOREIGN PATENT DOCUMENTS

| | | |
|---|---|---|
| CN | 1204222 A | 1/1999 |
| CN | 1239632 A | 12/1999 |
| CN | 1247681 A | 3/2000 |
| JP | 2000-050337 A | 2/2000 |
| WO | WO 98/37719 | 8/1998 |
| WO | WO 99/13665 | 3/1999 |

* cited by examiner

*Primary Examiner*—Wellington Chin
*Assistant Examiner*—F. Lin Khoo
(74) *Attorney, Agent, or Firm*—Alston & Bird LLP

(57) ABSTRACT

The invention discloses a CDMA soft handover method which can be used in present code division multiple access systems. The invention preserves current soft handover mechanisms triggered by a pilot signal strength variation measured by a mobile station. At the same time it introduces a communication quality indication parameter—continuous error frame indication measured by mobile station. Both function together to launch and to activate system soft handover. Without changing present soft handover processes, soft handover performance is improved, possibility of lost conversation is decreased and communication quality is raised.

5 Claims, 2 Drawing Sheets

SOFT HANDOVER METHOD FOR CDMA MOBILE COMMUNICATION SYSTEM

CROSS REFERENCE TO RELATED APPLICATIONS

This is a continuation application of PCT/CN01/00797, filed May 15, 2001, which is incorporated herein by reference in its entirety. The present application also claims benefit of Chinese Patent Application No. 00107632.9, filed May 19, 2000.

FIELD OF THE TECHNOLOGY

The present invention relates generally to handover controls for Code Division Multiple Access (CDMA) mobile communication systems, and more particularly to soft handover methods which use error frame indications to activate soft handover by introducing communication quality indication parameter into a CDMA soft handover mechanism.

BACKGROUND OF THE INVENTION

The so-called soft handover means that when a mobile station wants to communicate with a new base station, at first it does not interrupt its connection with the original base station. During the handover process, the mobile station remains in communication with the original cell and a new cell at the same time in order to guarantee voice channels communicate fluently. The advantages of soft handover are:
 (1) seamless handover;
 (2) maintenance of conversation continuity;
 (3) decreasing the possibility of lost conversations; and
 (4) decreasing the transmit power of the mobile station at the handover area.

CDMA soft handover improves conversation quality and increases in some meaning system capacity. This is one of the main advantages of CDMA systems.

In present CDMA systems, soft handover is triggered by pilot signal strength variation measured by the mobile station. This means that the mobile station measures the pilot signal strength of a nearby base station, and uses the measured value as a basis to control a pilot neighbor list, a candidate list, and an active list and to activate soft handover. The pilot active list is a pilot set, which corresponds to base stations that are being connected to the mobile station. The pilot candidate list is a set of pilots, which are not in the pilot active list currently, but have sufficient strength, indicating that the service channel of the corresponding base stations can be successfully demodulated by the mobile station. The pilot neighbor list is a set of pilots that are neither in the pilot active list nor in the pilot candidate list currently, but under certain condition they will enter the pilot candidate list.

During handover, the mobile station establishes a service link with a new base station using a multiple single path receiving shunt of a Rake receiver. At the same time, the mobile station does not interrupt the service link of the original service base station, until the mobile station receives a signal from the original base station that it is less than a threshold value. Then the mobile station cuts its link with the original base station. FIG. 1 details this process:

(1) A user uses base station A for conversation. After the base station measures a pilot signal strength greater than a specific value T-ADD, the mobile station will send a pilot strength measure message to base station A and will turn pilot B to the pilot candidate list.

(2) Base station A receives the pilot strength measure message and sends a handover indication message using base station A and B to the mobile station.

(3) The mobile station moves the candidate pilot signal from the pilot candidate list to the pilot active list, begins to use the pilot active list (A, B), and sends a handover completed message.

(4) When the pilot A signal strength drops below a specific value T-DROP, the mobile station launches an active handover clearance timer of the pilot.

(5) After completing the time of the active handover clearance timer, the mobile station sends a pilot strength measure message.

(6) The base station receives the pilot strength measure message and sends back a corresponding handover indication message using only base station B to mobile station.

(7) The mobile station moves pilot signal A from the pilot active list to the pilot neighbor list and sends out a handover completed message.

During the soft handover process mentioned above, when a mobile station enters an overlap area of multiple base stations, because of multiple access interference and decreased signal strength, communication quality of the mobile station can decrease. At this time the target pilot signal strength of the nearby base station is near T-ADD but does not reach T-ADD, i.e., conditions of activating soft handover according to pilot signal strength are not satisfied. Therefore, it is possible that conversation quality worsens or is even lost before the mobile station enters soft handover. This eliminates one of the technical advantages of CDMA systems, namely, soft handover.

SUMMARY OF THE INVENTION

The invention provides a soft handover method for CDMA systems. The method introduces a communication quality indication parameter, the error frame indication, into current soft handover mechanisms. This allows full use of CDMA technology to improve communication quality under conditions when communication quality would otherwise worsen or be lost altogether during the handover process. The invention further can increase soft handover performance and guarantee communication quality during cell crossover handover.

The invention provides a soft handover method for CDMA mobile communication systems without requiring changes to current CDMA system hardware and signaling design. Rather the invention merely modifies corresponding control flowcharts in order to effectively complement present technology. Thus the invention is easy to implement.

The invention can also preserve system soft handover mechanisms triggered by a pilot signal strength variation that is measured by a mobile station. At the same time it introduces a communication quality indication parameter—continuous error frame indication measured by the mobile station. Both functions together launch and activate system soft handover.

According to the above technical scheme, when a mobile station detects statistically continuous multiple error frame at its channel decoding unit, and the pilot candidate list of the mobile station does not include a new base station and the pilot neighbor list includes a neighbor base station having a pilot signal strength near a T-ADD value, then the mobile station sends a pilot signal strength measure message to the base station and the base station launches and activates soft handover process.

The base station launches and activates the soft handover process, and sends a handover indication message to mobile station. After the mobile station has received the handover indication message, the new pilot is directly removed from the pilot neighbor list to the pilot active list and a handover completed message is sent to the base station.

Further, in the above method, when the mobile station has measured a pilot signal strength that is greater than T-ADD, it sends a pilot strength measure message to the base station. When the pilot signal strength of the original base station has dropped down below to T-DROP, the mobile station launches an active list handover clearance timer of the pilot. After timing of the handover clearance timer is reached, the mobile station sends a pilot strength measure message to the base station. When the base station has received the message, it sends a handover indication message to the mobile station. Then the mobile station removes the pilot channel from the pilot active list to the pilot candidate list and sends out a handover completed message.

In addition, after the base station has received the pilot strength measure message sent by the mobile station when it has measured a pilot strength greater than T-ADD, the base station sends a handover indication message to the mobile station but the mobile station does not make any further response.

Measuring pilot signal strength of the base station in the pilot neighbor list as discussed above is implemented by selecting the most powerful one of multipath signals coming from different base stations.

Importantly, when the mobile station has measured a new base station member in the pilot candidate list, the present method can be used to send directly pilot strength measure message to launch and activate soft handover process. The invention preserves the triggering mechanism of pilot signal strength variation of current methods, coordinates with current methods and implements an effective complement to current methods.

The fundamental purpose of soft handover is to improve communication quality of mobile stations during cell corssover. The invention supplements one inadequacy of current soft handover processes of CDMA systems, in that it introduces directly one kind of communication quality indication parameters—error frame measure to soft handover triggering mechanism. The invention uses error frame indication to launch in time soft handover process while communication quality becomes worse. By selecting the most powerful one of multipath signals coming from different base stations, a better combining effect is achieved. Therefore a situation in which communication quality becomes worse and conversation may even be lost during cell corssover is improved. In this way, when conversation quality becomes worse during cell crossover, the mobile station response is faster and more direct.

In addition, implementation of the invention fully utilizes the original resource and technology. One does not need to increase or change system hardware and signaling design. The invention only slightly updates corresponding control flowchart, and utilizes existing measure result of conversation quality indication. This not only preserves the advantages of soft handover technology of current CDMA systems; but it also effectively complements, and allows easier implementation and extension of present CDMA systems.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
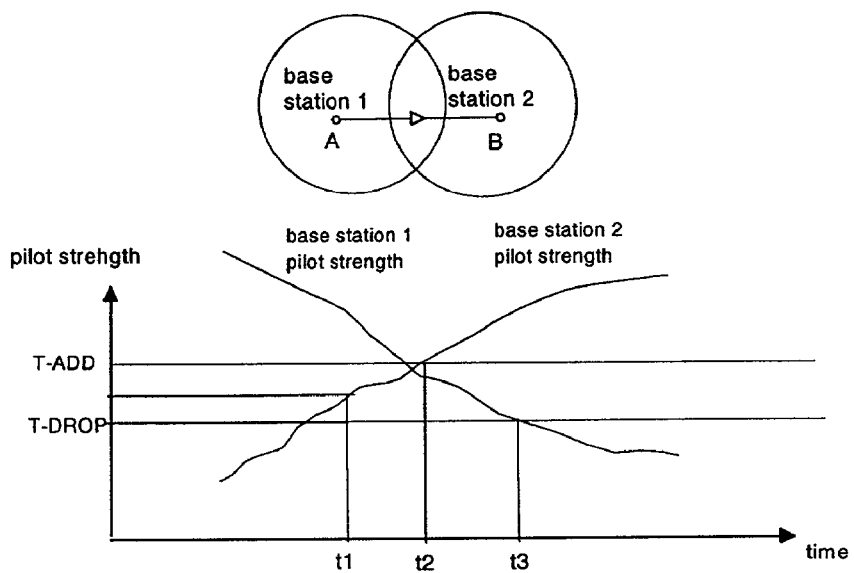
FIG. 3 is a schematic diagram of another embodiment of the method of the present invention.

First, referring to FIG. 3, suppose a mobile station is at position A of a base station 1 at the beginning of a conversation. During the conversation the mobile station moves to position B of a base station 2. FIG. 3 shows pilot strength variation, coming from base stations 1 and 2, received by the mobile station as it moves.

For conventional soft handover processes, base station 2 joins a pilot active list at t2 moment. During a period designated as t2 to t3, the mobile station receives and combines multipath signals coming from base stations 1 and 2. At the t3 moment, base station 1 withdraws from the pilot active list and the soft handover process is terminated. So, during the period t1 to t2, on the one hand the signal strength of base station 1 decreases rapidly and conversation quality becomes worse; on the other hand although the signal strength of base station 2 is about equal to the signal strength of base station 1, the signal strength of base station 2 does not reach T-ADD. Thus it cannot join the pilot active list and the more powerful signal cannot be effectively used by the receiver. This increases the possibility that voice quality decreases, and the conversation may be lost, before the mobile station enters the soft handover process.

Figure 1:
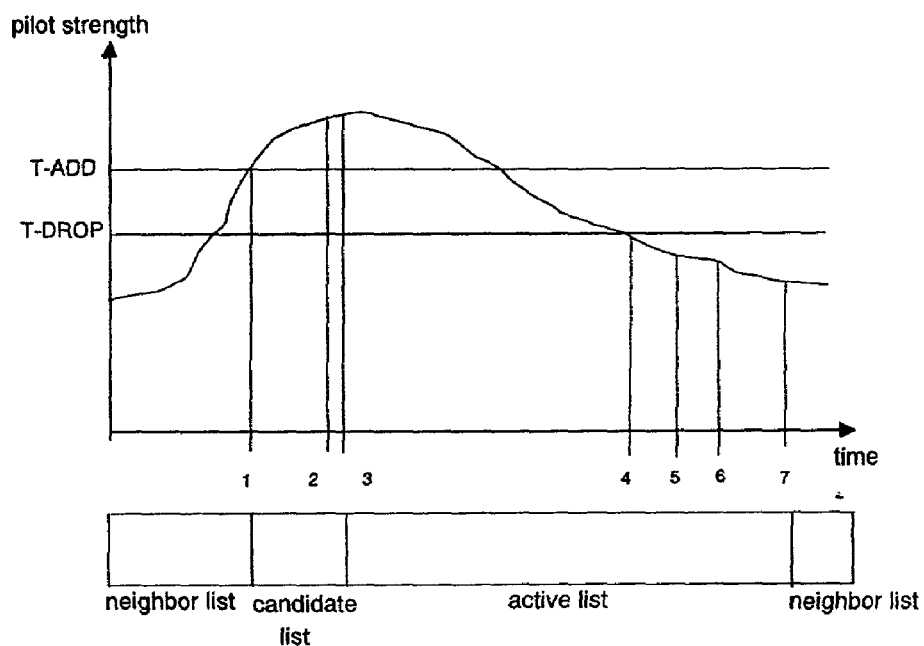
FIG. 1 is a schematic diagram illustrating an implementing process of the present CDMA system soft handover technology.
Figure 2:
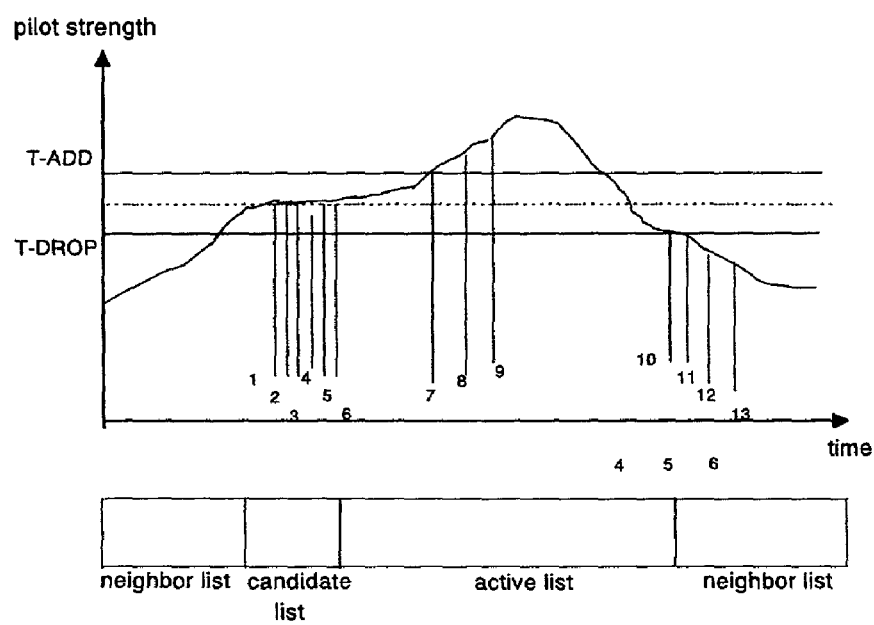
FIG. 2 is a schematic diagram illustrating an implementing process of the present invention.

FIG. 2 shows a schematic diagram for implementing the invention. A specific process for implementing the invention is as follows:

(1) A user uses base station A for conversation. The mobile station has statistically detected several continuous error frame indication at its channel decoder unit, i.e., it has detected that conversation quality is becoming bad.

(2) The mobile station checks whether there is a base station member in its pilot candidate list.

(3) If there is not a member in the pilot candidate list, the mobile station checks the pilot channel strength of a neighbor base station in its pilot neighbor list and discovers that there is a neighbor base station B whose pilot channel strength is near T-ADD.

(4) The mobile station sends a pilot strength measure message to the base station A.

(5) Base station A receives the pilot strength measure message, launches the soft handover process, and sends a handover indication message using base stations A and B to the mobile station.

(6) The mobile station moves pilot B from the pilot neighbor list to the pilot active list directly, starts to use the pilot active list (A, B), and sends a handover completed message to the base station.

(7) After the mobile station has determined that the pilot channel strength of base station B is greater than T-ADD, the mobile station sends a pilot strength measure message to the base station.

(8) The base station sends a handover indication message to the mobile station.

(9) The mobile station does not make any response to the handover indication message.

(10) When the channel strength of pilot A channel drops to less than T-DROP, the mobile station launches a pilot active list handover clearance timer of the pilot.

(11) When the time has lapsed on the handover clearance timer of the pilot active list, the mobile station sends a pilot strength measure message.

(12) The base station sends back corresponding a handover indication message only using base station B to the mobile station.

(13) The mobile station moves the pilot channel from the active list to the neighbor list and sends a handover completed message.

Where T-ADD is the threshold value for starting the soft handover process, TDROP is the threshold value for terminating handover and launching the handover clearance timer. These values are all provided by a network layer.

In the invention, only one kind of communication quality indication parameters—error frame indication is introduced to currently used soft handover mechanisms of pilot signal strength triggering without increasing or updating present system hardware and signaling design etc. Merely modifying slightly the mobile station control flowchart can prevent worsening conversation conditions, or even lost conversation, before the mobile station starts the handover process.

Referring to FIG. 3 again, at t1 moment, the signal strength of base station 1 drops down rapidly. With FER (Error Frame Ratio) the mobile station has monitored and determined that conversation quality is beginning to deteriorate. Simultaneously the mobile station has also detected that the signal of base station 2 is getting nearer to TADD. At this moment the mobile station launches the soft handover process of the invention activated by error frame indication to improve conversation quality by using the more powerful signal strength of base station 2. Within t1 to t3 time period, the mobile station is in soft handover state. It receives and combines multipath signals coming from base station 1 and base station 2. At t3 moment base station 1 withdraws from the pilot active list, and the soft handover process is terminated. It has been seen that system hardware and signaling design is identical with present technology; the only difference is that the method allows base station 2 to enter in advance from original t2 moment to t1 moment by using error frame indication to activate soft handover of the invention. This way the more powerful signal strength of base station 2 is thoroughly used to improve conversation quality and to implement crossing cell handover of the mobile station from base station 1 to base station 2 steadily and safely.

Figure 4:
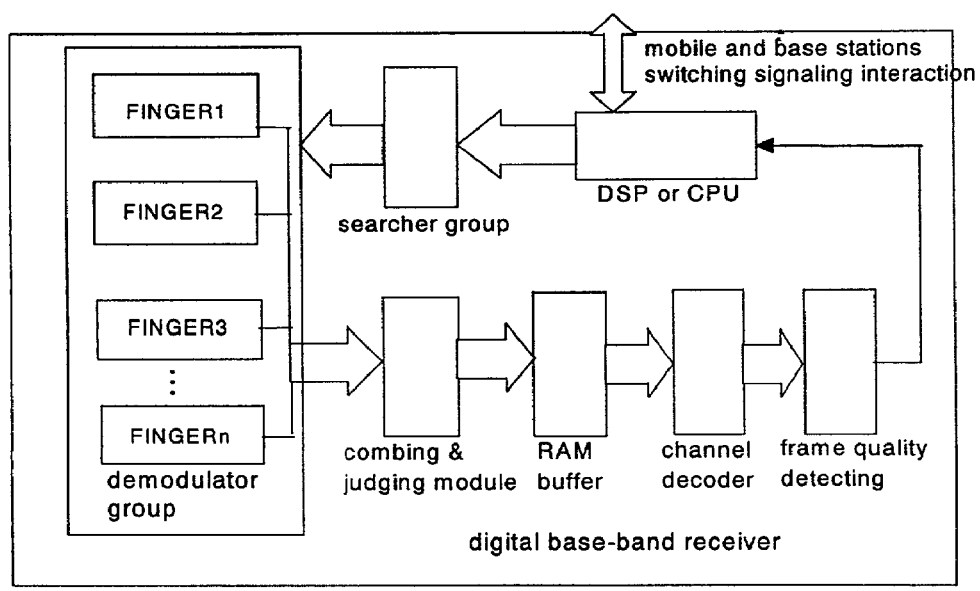
FIG. 4 is receiver block diagram of a CDMA system implementing the method of the present invention.

FIG. 4 shows a receiver block diagram implementing the error frame indication that activates soft handover method. Voice data passes a RAKE receiver and to a channel decoding board. After decoding, data frame is judged whether it is a correct frame or an error frame. The result is feedback to CPU or DSP (digital signal processing unit), and according to conditions and processes of the invention, error frame indication soft handover process is triggered and completed.

In embodiment step (2) of error frame indication soft handover process mentioned above, if there is a new base station in the pilot candidate list, the method will send a pilot strength measure message and to launch soft handover process same as present technology method. Obviously, error frame indication soft handover method has no influence on soft handover process at normal conditions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A soft handover method useful in CDMA mobile communication systems, comprising:
   (a) detecting error frame indication within a channel decoding unit of a mobile unit,
   (b) determining if a new base station member is in a pilot candidate list when there are detected continuous plural error frame indication;
   (c) if a new base station is found in accordance with step (b), sending a pilot strength measure message direct and activating a soft handover process; or
   (d) if a new base station is not found in accordance with step (b), determining whether there is at least one neighbor base station within a pilot neighbor list with a pilot signal strength near a threshold T-ADD value for launching a soft handover process as provided by a network layer; and
   (e) if at least one neighbor base station is found in accordance with step (d), sending a pilot strength measure message from the mobile station to the base station so as to activate a soft handover process upon receipt of the pilot strength message.

2. The method according to claim 1, further comprising:
   (f) after the base station launches and activates the soft handover process, sending a handover indication message from the base station to the mobile station;
   (g) after the mobile station has received the handover indication message, removing the pilot of the new base station from the pilot neighbor list to a pilot active list; and
   (h) sending a handover completed message to the base station.

3. The method according to claim 2, further comprising:
   (i) determining whether the pilot signal strength of the new base station is greater than the threshold value T-ADD by the mobile station;
   (j) if the pilot signal strength of step (i) is greater than T-ADD, then sending a pilot strength measure message to the base station; and
   (k) after the base station has received the pilot strength measure message, sending a handover indication message from the base station to the mobile station without further response from the mobile station.

4. The method according to claim 3, further comprising:

(l) measuring by the mobile station whether the pilot signal strength of the original base station drops to lower than a value T-DROP;

(m) if it is, launching a pilot active list handover clearance timer and sending a pilot strength measure message to the base station after completion of a set time;

(n) when the base station has received the message, sending a handover indication message from the base station to the mobile station;

(o) removing the pilot channel from the pilot active list to the pilot candidate list and sending a handover completed message by the mobile station;

wherein the value T-DROP is a threshold value for terminating soft handover and launching handover clearance timer and is provided by a network layer.

5. The method according to claim 1, wherein said measured pilot signal strength of the base station in the pilot neighbor list is determined by selecting the most powerful one of multipath signals coming from different base stations.

* * * * *